(12) United States Patent
Laiho et al.

(10) Patent No.: US 7,761,055 B2
(45) Date of Patent: Jul. 20, 2010

(54) EXTENSION DEVICE

(75) Inventors: Kimmo Laiho, Turku (FI); Mauri Mäkivuoti, Turku (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/573,770

(22) PCT Filed: Sep. 22, 2004

(86) PCT No.: PCT/IB2004/051829

§ 371 (c)(1),
(2), (4) Date: Mar. 28, 2006

(87) PCT Pub. No.: WO2005/031910

PCT Pub. Date: Apr. 7, 2005

(65) Prior Publication Data

US 2007/0060092 A1    Mar. 15, 2007

(30) Foreign Application Priority Data

Sep. 29, 2003   (GB)   ................................. 0322774.1

(51) Int. Cl.
*H04B 7/00*   (2006.01)
(52) U.S. Cl. .................. 455/41.2; 725/138; 725/135; 725/90; 725/38; 725/61; 348/384.1; 455/420; 455/66.1; 455/418; 455/419; 455/41.1; 455/41.3; 455/550.1; 455/571; 455/127.2; 455/127.3; 455/136; 455/138; 455/569.1; 455/569.2; 343/906; 343/845; 343/905

(58) Field of Classification Search ................. 455/338, 455/274, 74, 343.1, 343.2, 343.5, 343.6, 455/339, 344, 341, 66.1, 418–420, 41.1, 455/41.2, 41.3, 550.1, 571, 127.2, 127.3, 455/136, 138, 569.1, 569.2, 575.6, 575.9, 455/90, 414, 456, 345; 725/138, 135, 90, 725/38, 61–62; 348/384.1; 343/906, 845, 343/905, 904, 702, 718, 846, 848; 307/147; 379/457; 341/50; 370/432

See application file for complete search history.

(56) References Cited

U.S. PATENT DOCUMENTS

| | | | | | |
|---|---|---|---|---|---|
| 4,083,221 | A | * | 4/1978 | Whitted | .................... 72/405.06 |
| 5,574,964 | A | * | 11/1996 | Hamlin | ........................ 725/78 |
| 5,623,531 | A | * | 4/1997 | Nilssen | ....................... 379/56.2 |
| 5,644,622 | A | * | 7/1997 | Russell et al. | ............ 455/422.1 |
| 5,822,705 | A | * | 10/1998 | Lehtola | .................... 455/575.7 |

(Continued)

FOREIGN PATENT DOCUMENTS

DE    10123556 A1    12/2002

(Continued)

*Primary Examiner*—Lana Le
*Assistant Examiner*—April G Gonzales

(57) ABSTRACT

An antenna (8), mounted to a roof (3) of a building (1), receives digital broadcast transmissions and feeds a signal through a cable (9) to a desk stand (2). The desk stand has an amplifier and a loop antenna. A mobile telephone handset (6) capable of receiving digital broadcast transmissions also includes a loop antenna. Using inductive coupling, the signal is transmitted from the desk stand to the mobile telephone handset.

38 Claims, 7 Drawing Sheets

U.S. PATENT DOCUMENTS

| | | | | |
|---|---|---|---|---|
| 5,861,851 | A * | 1/1999 | Chang | 343/702 |
| 5,867,794 | A * | 2/1999 | Hayes et al. | 455/557 |
| 6,031,492 | A * | 2/2000 | Griffin et al. | 343/702 |
| 6,052,603 | A * | 4/2000 | Kinzalow et al. | 455/557 |
| 6,073,003 | A * | 6/2000 | Nilssen | 455/402 |
| 6,091,931 | A * | 7/2000 | Ben-Efraim et al. | 455/3.02 |
| 6,118,499 | A * | 9/2000 | Fang | 348/726 |
| 6,133,884 | A | 10/2000 | Talvitie et al. | 343/702 |
| 6,167,278 | A * | 12/2000 | Nilssen | 455/462 |
| 6,239,769 | B1 | 5/2001 | Ericsson et al. | 343/906 |
| 6,295,033 | B1 * | 9/2001 | Chatzipetros et al. | 343/713 |
| 6,317,089 | B1 * | 11/2001 | Wilson et al. | 343/713 |
| 6,434,187 | B1 * | 8/2002 | Beard et al. | 375/219 |
| 6,459,915 | B2 * | 10/2002 | Nakamura et al. | 455/571 |
| 6,519,328 | B1 * | 2/2003 | Rumbaugh | 379/93.06 |
| 6,549,774 | B1 * | 4/2003 | Titlebaum et al. | 455/427 |
| 6,650,649 | B1 * | 11/2003 | Muhammad et al. | 370/402 |
| 6,696,922 | B1 * | 2/2004 | Wong et al. | 340/7.32 |
| 6,885,674 | B2 * | 4/2005 | Hunt et al. | 370/420 |
| 6,892,080 | B2 * | 5/2005 | Friesen et al. | 455/571 |
| 6,952,576 | B2 * | 10/2005 | Fish et al. | 455/414.1 |
| 7,081,857 | B2 * | 7/2006 | Kinnunen et al. | 343/702 |
| 7,107,063 | B1 | 9/2006 | Bates et al. | 455/456.1 |
| 7,130,623 | B2 * | 10/2006 | Kirkeby et al. | 455/420 |
| 7,133,082 | B2 * | 11/2006 | Limberg | 348/725 |
| 7,184,722 | B1 * | 2/2007 | Johnson et al. | 455/127.1 |
| 7,349,722 | B2 * | 3/2008 | Witkowski et al. | 455/569.2 |
| 7,356,354 | B2 * | 4/2008 | Itsukaichi | 455/557 |
| 2001/0051537 | A1 | 12/2001 | Nakamura et al. | 455/571 |
| 2002/0003495 | A1 * | 1/2002 | Johnstone et al. | 342/357.13 |
| 2002/0021371 | A1 * | 2/2002 | Konishi et al. | 348/678 |
| 2002/0068549 | A1 * | 6/2002 | Tendler | 455/414 |
| 2002/0081987 | A1 * | 6/2002 | Yoshida et al. | 455/277.1 |
| 2003/0014766 | A1 * | 1/2003 | Dinwiddie et al. | 725/126 |
| 2003/0192061 | A1 * | 10/2003 | Hwangbo et al. | 725/138 |
| 2003/0231864 | A1 * | 12/2003 | Wakahara | 386/68 |
| 2004/0090352 | A1 * | 5/2004 | Jaffe et al. | 341/50 |
| 2004/0137929 | A1 * | 7/2004 | Jones et al. | 455/517 |
| 2004/0171377 | A1 * | 9/2004 | Engstrom | 455/419 |
| 2004/0204192 | A1 * | 10/2004 | Holloway et al. | 455/575.1 |
| 2004/0248543 | A1 * | 12/2004 | Itsukaichi | 455/345 |
| 2004/0260669 | A1 * | 12/2004 | Fernandez | 707/1 |
| 2005/0043888 | A1 * | 2/2005 | Kang | 701/213 |
| 2005/0047426 | A1 * | 3/2005 | Aaltonen et al. | 370/432 |
| 2005/0055729 | A1 * | 3/2005 | Atad et al. | 725/118 |
| 2005/0071878 | A1 * | 3/2005 | Asano et al. | 725/78 |
| 2005/0186931 | A1 * | 8/2005 | Laiho et al. | 455/280 |
| 2005/0253973 | A1 * | 11/2005 | Adachi et al. | 348/838 |
| 2005/0288059 | A1 * | 12/2005 | Maejima et al. | 455/557 |
| 2006/0026653 | A1 * | 2/2006 | Matsunami | 725/81 |
| 2006/0212910 | A1 * | 9/2006 | Endres et al. | 725/73 |
| 2007/0197264 | A1 * | 8/2007 | Itsukaichi | 455/569.2 |

FOREIGN PATENT DOCUMENTS

| | | |
|---|---|---|
| EP | 0862278 A2 | 9/1998 |
| EP | 0905915 A2 | 3/1999 |
| EP | 1076376 A2 | 2/2001 |
| EP | 1289061 A2 | 3/2003 |
| GB | 2266997 | 11/1993 |
| GB | 2353412 | 2/2001 |
| WO | 00/16236 | 3/2000 |
| WO | WO 02/09361 A1 | 1/2002 |

* cited by examiner

EXTENSION DEVICE

CROSS REFERENCE TO RELATED APPLICATIONS

This application is the U.S. National Stage of International Application Number PCT/IB2004/051829 filed Sep. 22, 2004, published in English Apr. 7, 2005 under International Publication Number WO 2005/031910 A2, and applicant claims priority from Great Britain Application Number GB 0322774.1 filed Sep. 29, 2003.

FIELD OF THE INVENTION

The present invention relates to an extension device for delivering a digital broadcast to a mobile terminal.

BACKGROUND ART

Digital broadcasting networks can be used to deliver enhanced services to users having digital broadcasting receivers. Examples of digital broadcasting networks include a Digital Video Broadcasting (DVB) network, a Digital Audio Broadcasting (DAB) network, an Advanced Television Systems Committee (ATSC) network and an Integrated Service Digital Broadcasting (ISDB) network.

It is proposed to provide Internet Protocol Datacast (IPDC) services as part of a terrestrial Digital Video Broadcasting (DVB-T) system or handheld DVB (DVB-H) system. IPDC permits data to be transmitted at high transfer rates to many users simultaneously and so can be used to stream video content and transfer data files.

It is also proposed to incorporate a DVB receiver into a conventional mobile telephone handset or personal digital assistant (PDA). This has the advantage that it allows a user to download large amounts of data quickly using IPDC, data which ordinarily would take too long and be prohibitively expensive to transfer using a conventional mobile handset and conventional public land mobile networks.

Initially, provision of DVB transmitters and implementation of IPDC is unlikely to be widespread. Therefore, service coverage is likely to be limited. Therefore, it is desirable to extend service coverage wherever possible. Furthermore, even when further transmitters are installed and IPDC becomes more widely available, it is still desirable to maximise service coverage.

Service coverage is often restricted because receivers are taken indoors. Walls and other parts of a building attenuate transmitted signals. Thus, although service coverage may be adequate outdoors, it may be insufficient indoors even though the receiver has moved just a few meters. Additionally, service coverage may be impeded by other buildings.

Extension sets are known. EP-A-1076376 describes an extension set for a DVB-T receiver in which the extension set and receiver are connected by a wired link. This has the disadvantage that it restricts mobility of the mobile terminal. WO-A-02089361 also describes an extension set for a DVB-T receiver in which the extension set re-emits a received signal. However, this has a drawback of being indiscriminate. Thus, a receiver may receive signals from a number of extension sets and the signals may interfere. DE-A-10123556 describes a mobile terminal holder in which the holder transmits a signal to the mobile telephone. However, the signal can be significantly attenuated during transmission.

The present invention seeks to ameliorate at least some these problems.

SUMMARY OF THE INVENTION

According to a first aspect of the present invention there is provided an extension device for delivering digital broadcasts to a mobile terminal, the device comprising means for receiving a signal carrying the digital broadcast received via an antenna; and a loop or coil configured to couple inductively with a corresponding loop or coil included in the mobile terminal so as to transmit the signal to the mobile terminal.

The device may further comprise means for amplifying the signal. The amplifying means may be powered by the mobile terminal. The amplifying means may be controlled by said mobile terminal. The amplifying means may intermittently operate under the control of the mobile terminal. This can have the advantage of reducing power consumption and minimising transmission of signals when not required.

The device may comprise means for detecting the mobile terminal and means for controlling operation of said amplifying means in dependence upon the position of the mobile terminal. The detecting device may comprise a switch to determine whether said mobile terminal is attached to the extension device. The term "attached" means placed in, on or against. The detecting device may comprise means for sensing whether the mobile terminal is located within a predetermined distance of said extension device. The controlling means may cause the amplifying means to reduce gain or to be by-passed when the mobile terminal is in a given position, such as when the mobile is attached or is within the predetermined range. This can help to limit the power delivered to the mobile terminal, which can help to prevent saturation of amplifiers and/or other circuits in the mobile terminal.

The device may further comprise an antenna for receiving an amplified signal from the amplifying means and radiatively transmitting the amplified signal to the mobile terminal, wherein said controlling means causes the signal to be routed to the loop or coil when the mobile terminal is in a given position, such as when the mobile is attached or is within the predetermined range and to be routed to the amplifying means when not. This can help to deliver the signal in a suitable way.

The extension device may comprise means for filtering the signal from at least one other signal.

The extension device may comprise means for receiving power from an external source and means for delivering power to the mobile terminal to permit recharging of a rechargeable battery included in the mobile terminal.

The extension device may be adapted to be placed on a piece of furniture, such as desk or table. For example, the extension device may be configured as a desk stand. Thus, the extension device can be put at a level and/or in a place where the mobile terminal is likely to be used or stored.

The loop or coil may be a loop and the loop may be arranged substantially around a perimeter of a face of the device. The loop or coil may have an area of between 10 and 50 cm$^2$.

The device may further comprise an antenna mounted on a roof or to an externally facing side of an external wall of a building.

According to a second aspect of the present invention there is provided apparatus for receiving a time-sliced digital broadcast comprising a mobile terminal including a loop or coil and an extension device comprising means for receiving a signal carrying the digital broadcast received via an antenna and a loop or coil configured to couple inductively with the corresponding loop or coil included in a mobile terminal so as to transmit the signal to the mobile terminal.

The mobile terminal may cause the amplifying means to operate when reception of a time slice is expected.

According to a third aspect of the present invention there is also provided a method of delivering a digital broadcast to a mobile terminal, the method comprising receiving a signal carrying a digital broadcast via an antenna and providing said signal to a loop or coil configured to couple inductively with a corresponding loop or coil included in the mobile terminal so as to transmit the signal to the mobile terminal.

BRIEF DESCRIPTION OF THE DRAWINGS

Embodiments of the present invention will now be described, by way of example, with reference to the accompanying drawings in which.

DETAILED DESCRIPTION OF THE INVENTION

Operating Environment 1

Figure 1:
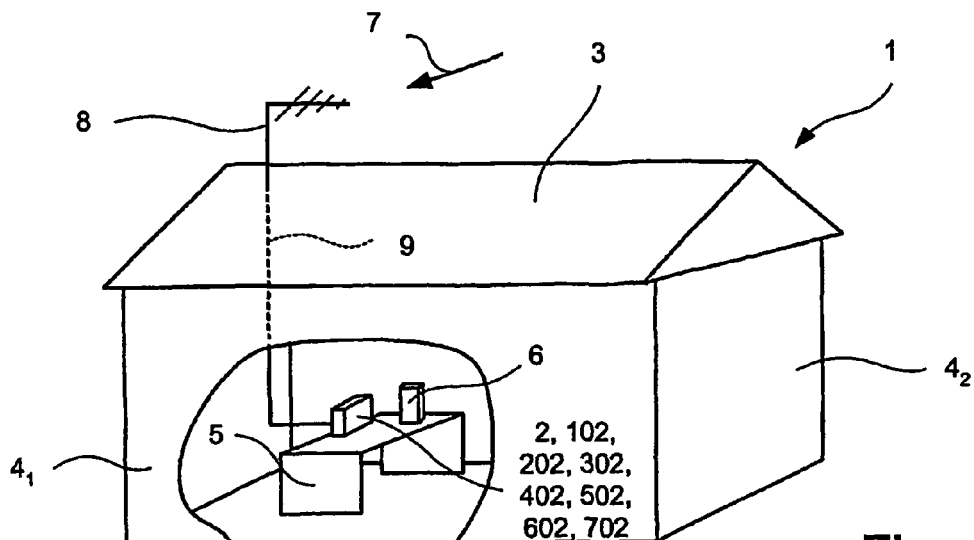
FIG. 1 shows an example of an environment in which an extension device according to the present invention can be used.

Referring to FIG. 1, an environment 1 in which an extension device 2, 102, 202, 302, 402, 502, 602, 702 according to the present invention can be used is shown. In this example, the environment 1 is a two-story house having a roof 3, external walls $4_1$, $4_2$, internal walls (not shown) and floors (not shown). However, the environment may be any domestic building of any design and having any number of floors, or a part of a domestic building, such as a room, flat or apartment. The environment may be any sort of commercial or industrial premises, such as an office or factory. The environment may be located underground.

For the purposes of illustration, a part of an external wall $4_1$ is shown removed to reveal the inside of the house 1. Inside the house 1, the extension device 2, 102, 202, 302, 402, 502, 602, 702 is conveniently placed on a piece of furniture 5, such as a desk or table, and is used to deliver a digital broadcast to a mobile terminal 6. A signal 7 carrying the digital broadcast is received via an antenna 8, which is preferably mounted on the roof 3. Alternatively, the antenna 8 may be mounted to an external wall $4_1$, $4_2$. The antenna 8 is connected to the extension device 2, 102, 202, 302, 402, 502, 602, 702 by a cable 9. Preferably, the cable is in the form of a co-axial cable. However, the signal may be converted into an optical signal which may be transmitted through fibre or through air.

Mobile Terminal 6

Figure 2:
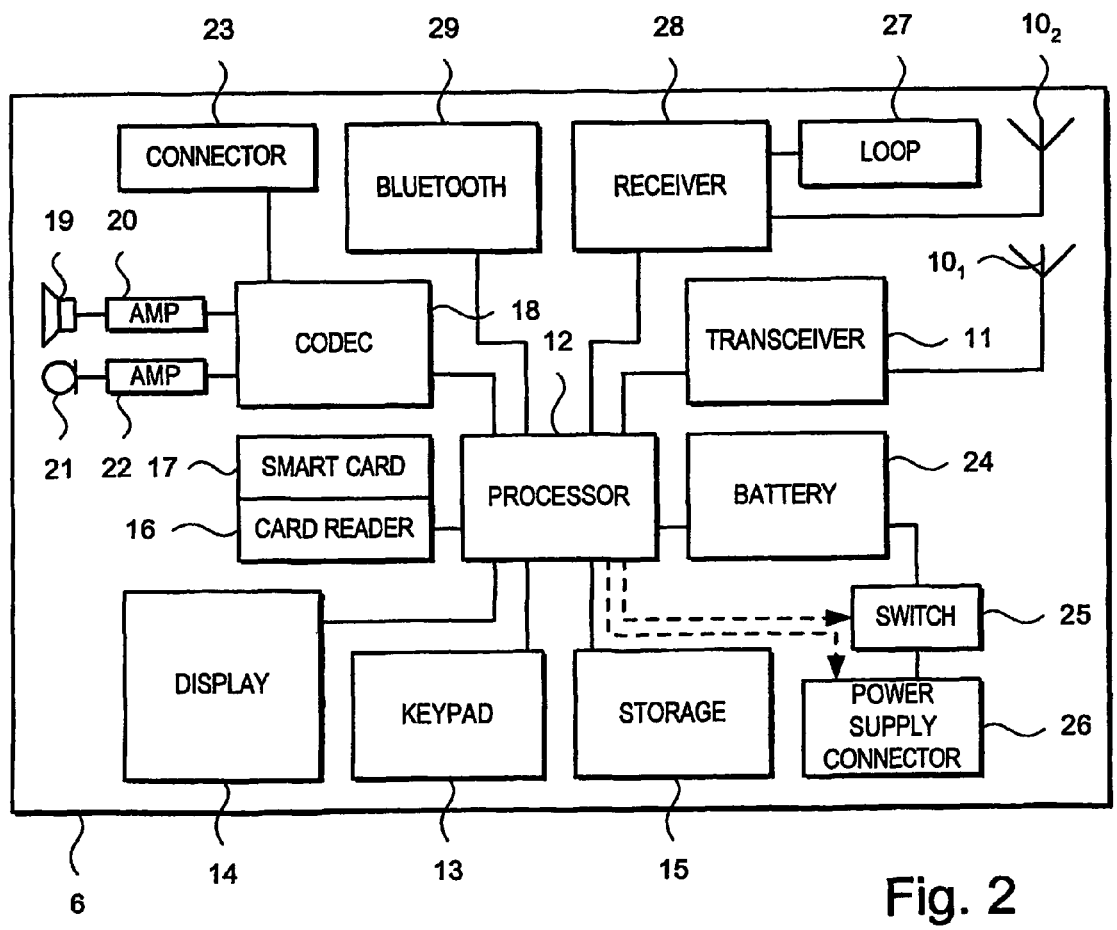
FIG. 2 is a schematic diagram of a mobile terminal for use with an extension device according to one embodiment of the present invention.

Referring to FIG. 2, the mobile terminal 6 is in one embodiment of the invention in the form of a mobile communications device such as a mobile telephone handset for use in both a communications network (not shown) and a digital broadcasting network (not shown). Preferably, the communications network is a second generation (2G) communications network, such as a GSM network. However, the communications network may be any mobile phone network, for example a 3G network, such as UMTS.

The mobile telephone handset 6 comprises an antenna $10_1$ for sending and receiving signals via the communications network and receiving signals from the broadcasting network, transceiver circuit 11 for, inter alia, modulating/demodulating and amplifying signals from the communications network (not shown), processor 12 for, inter alia, coding/decoding signals, baseband processing and other signal processing and managing operation of the mobile terminal 6, keypad 13 for providing user input, display 14 for providing output, storage 15, a smart card reader 16, smart card 17 received in the smart card reader 16, a coder/decoder (codec) 18, a speaker 19 with corresponding amplifier 20 and a microphone 21 with a corresponding pre-amplifier 22, a connector 23 for a hands free kit (not shown), a battery 24, a switch 25 and a connector 26 for a mains supply (not shown) or a mains-powered supply (not shown). The processor 12 can be used to open and close switch 25. The processor can also be used to control the extension device 2, 102, 202, 302, 402, 502, 602, 702 preferably via connector 26.

The mobile terminal 6 also comprises means 27 for receiving a signal using inductive coupling, an optional second antenna $10_2$ and a receiver circuit 28 for, inter alia, de-modulating and amplifying signals from the digital broadcasting network (not shown) received via antenna $10_2$ or inductive coupling receiving means 27. The inductive coupling receiving means 27 takes the form of a loop or a coil. The loop 27 may run around a perimeter of a face of the device 6 and have an area of the order between 0.1 to 10 cm$^2$. Preferably, the loop 27 has an area of between 10 and 50 cm$^2$. A coil comprising a number of turns may be used.

Figure 10:
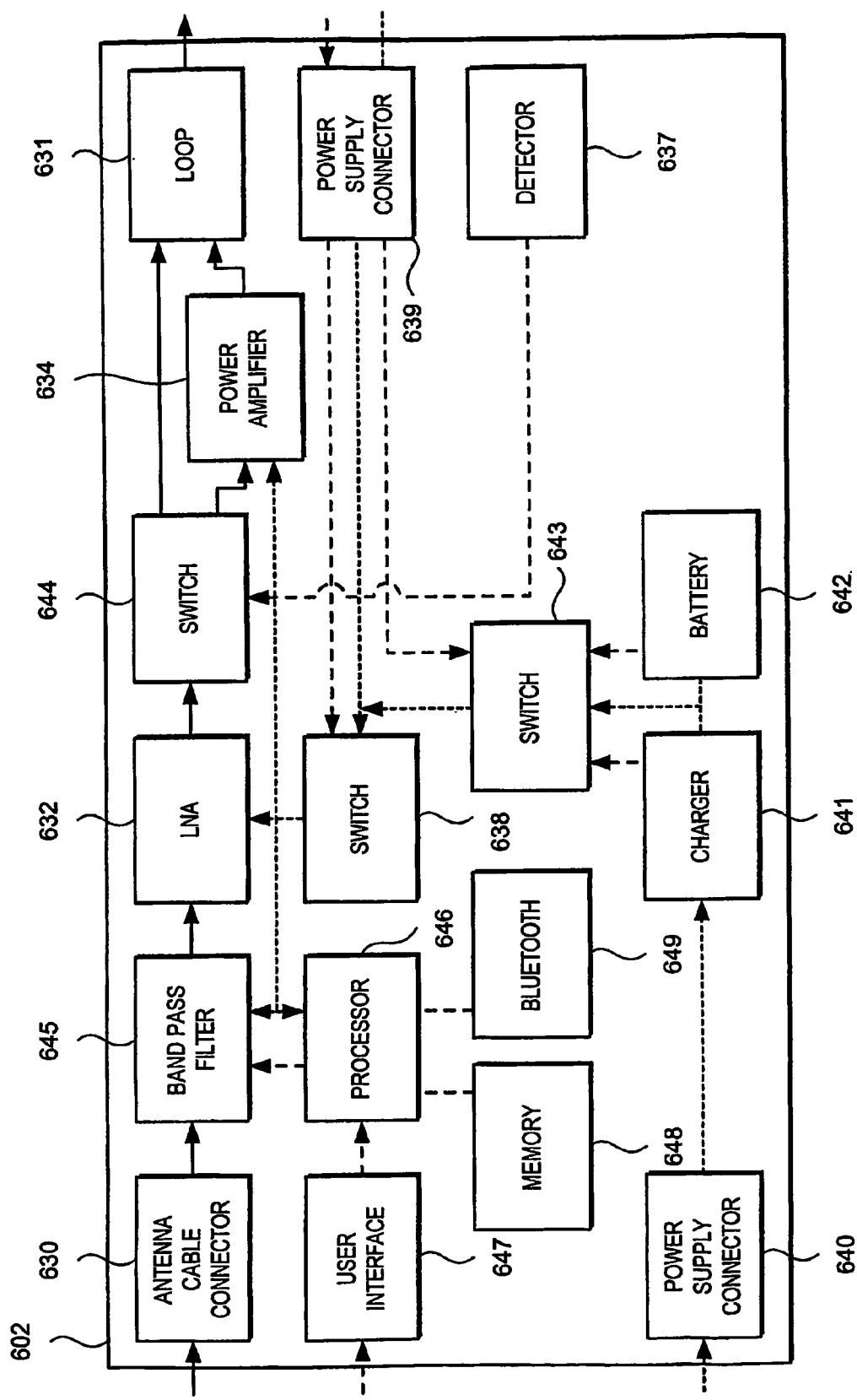
FIG. 10 is a schematic diagram of a seventh embodiment of an extension device according to the present invention.

The mobile terminal 6 also comprises a Bluetooth™ transceiver 29 for establishing a personal area network (PAN) with one or more other Bluetooth™ transceivers, such as Bluetooth™ transceiver 649 (FIG. 10), thereby allowing the mobile terminal 6 to exchange signals with other Bluetooth-enabled devices, such as extension device 602 (FIG. 10).

The receiver 28 is in the form of an Internet Protocol Datacasting (IPDC) receiver. Preferably, the digital broadcasting network is a terrestrial Digital Video Broadcasting (DVB-T) network or a handheld DVB (DVB-H) network. However, other digital broadcasting networks may be used such as a Digital Audio Broadcasting (DAB) network, an Advanced Television Systems Committee (ATSC) network or an Integrated Service Digital Broadcasting (ISDB) network. To receive signals from the digital broadcasting network (not shown), the antenna $10_2$ and receiver circuit 28 are adapted to receive ultra high frequency (UHF) signals, for example lying in the range 470 to 862 MHz.

It will be appreciated that loop 27 may be used as a receiving antenna instead of antenna $10_2$.

As will be explained in more detail later, the inductive coupling means 27 can be used to receive a signal carrying a digital broadcast from the digital broadcasting network (not shown) received via antenna 8 (FIG. 1) and delivered by an extension device 2, 102, 202, 302, 402, 502, 602, 702 (FIG. 1).

First Embodiment

Figure 3:
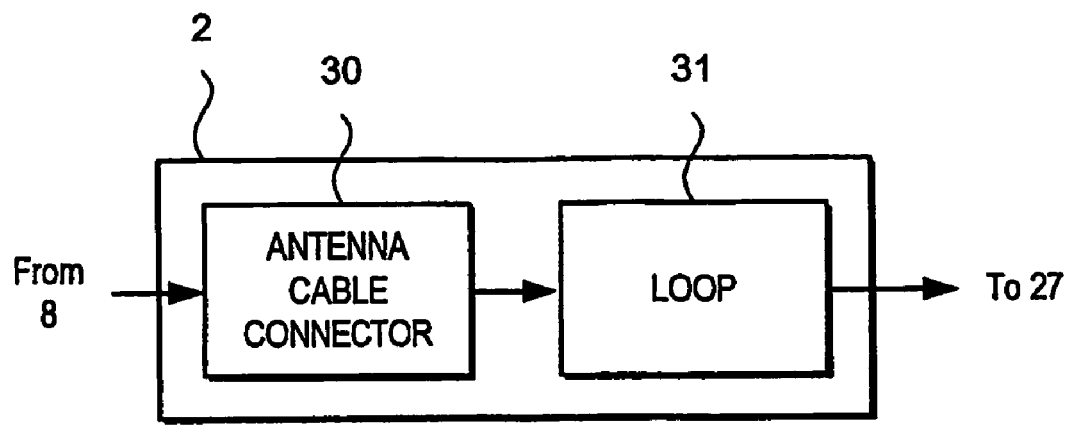
FIG. 3 is a schematic diagram of a first embodiment of an extension device according to the present invention.

Referring to FIG. 3, a first embodiment of an extension device 2 according to the present invention is shown.

The extension device 2 comprises means 30 for receiving a signal received via an antenna which is in the form of a connector, also referred to as a "terminal", for receiving a corresponding connector (not shown) at the end of the cable 9 (FIG. 1) and means 31 for transmitting the signal to the mobile terminal 6 by inductive coupling which is in the form of loop. The loop 31 may have an area of the order between 0.1 to 10 $cm^2$. Preferably, the loop 31 has an area of between 10 and 50 $cm^2$. Preferably, the loop 31 is impedance matched to the cable 9 (FIG. 1) connected to the connector 30.

In use, the mobile terminal 6 is preferably located in the near field of the loop 31, in other words the mobile terminal is placed no more than a few centimetres away from the loop 31 and the loops 27, 31 are inductively coupled. The mobile terminal 6 and the extension device 2 may be separated by greater distances, but this leads to significant signal attenuation.

Figure 4:
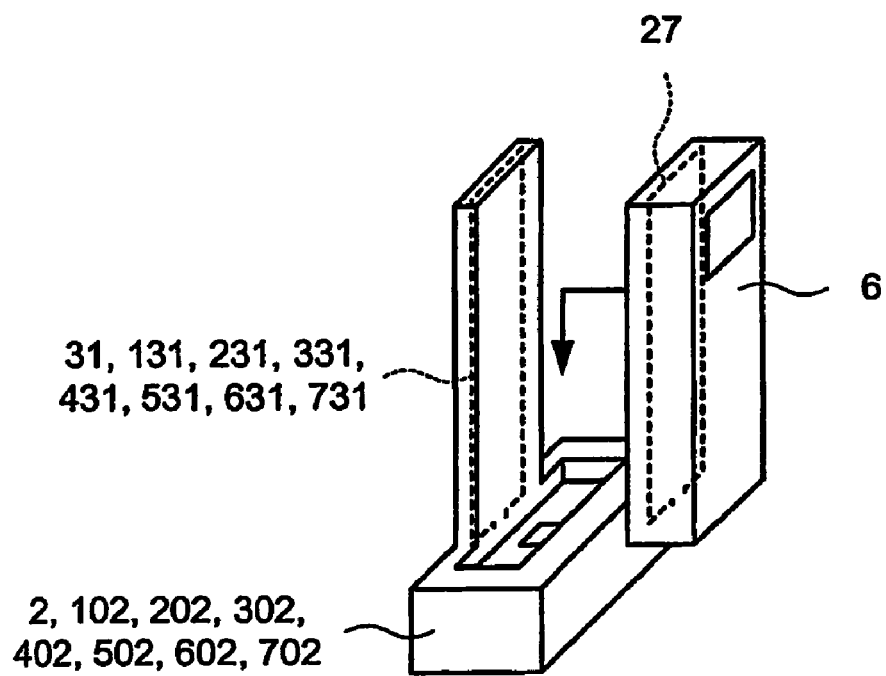
FIG. 4 is a perspective view of an extension device according to various embodiments of the present invention and a mobile terminal.

Referring to FIG. 4, the extension device 2 is preferably arranged as a cradle for receiving mobile terminal 6. The extension device 2 is preferably arranged such that when the mobile terminal 6 is received in or placed on the extension device 2, the loop 27 of the mobile terminal 6 is placed against or within a few millimetres of the loop 31 of the extension device 2. Preferably, planes of the loops 27, 31 are substantially parallel. Preferably, the loops 27, 31 are co-axial.

Referring also to FIGS. 1 and 2, a signal 7 is received by the antenna 8, fed through cable 9 and supplied to the extension device 2 via the connector 30. The signal 7 is fed through the loop 31.

A corresponding signal is induced in the loop 27 of the mobile terminal 6 and is passed into the receiving circuit 28 (FIG. 2) for amplifying and demodulating and thereafter baseband processing, channel decoding, de-multiplexing and further processing by processor 12 (FIG. 2).

In this way, the mobile terminal 6, which might otherwise not be able to receive the signal 7 inside the house 1, can now do so with the help of the extension device 2.

In this embodiment of the present invention, amplifying means is not used because antenna 8 (FIG. 1) provides a gain of up to 10 dB and even up to 20 dB. A signal booster (not shown), which is also known as a "mast amplifier", may also be provided.

Second Embodiment

Figure 5:
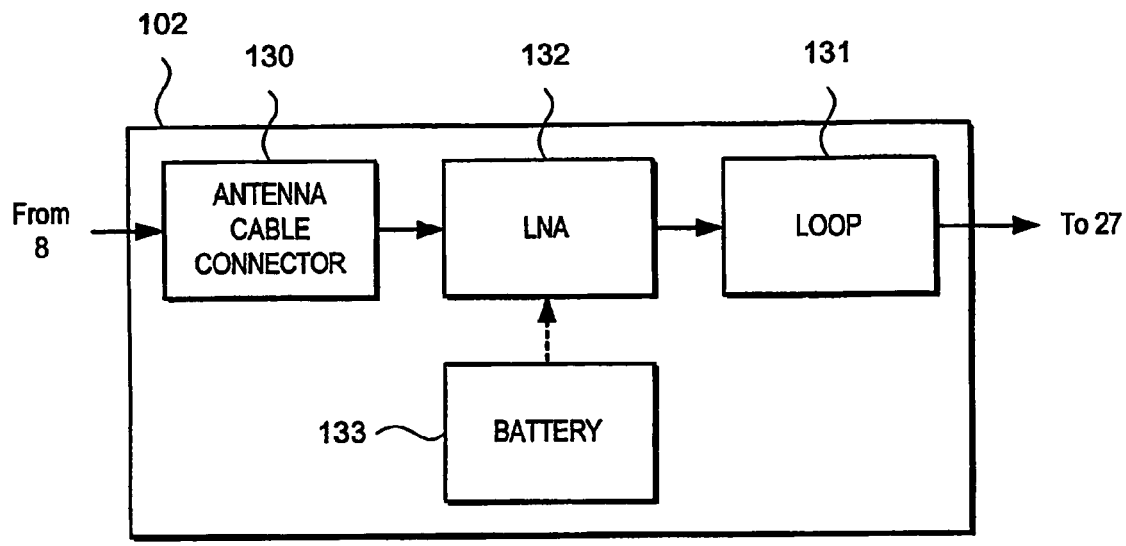
FIG. 5 is a schematic diagram of a second embodiment of an extension device according to the present invention.

Referring to FIG. 5, a second embodiment of an extension device 102 according to the present invention is shown.

The extension device 102 comprises means 130 for receiving a signal received via an antenna which is in the form of a connector, also referred to as a "terminal", for receiving a corresponding connector (not shown) at the end of the cable 9 (FIG. 1), means 132 for amplifying the signal in the form of a wideband UHF low noise amplifier (LNA) and means 131 for transmitting the amplified signal to the mobile terminal 6 by inductive coupling which is in the form of loop. The loop 131 may have an area of the order between 0.1 to 10 $cm^2$. Preferably, the loop 131 has an area of between 10 and 50 $cm^2$. A battery 133 powers the LNA 132. Preferably, the LNA 132 is impedance matched to the cable 9 (FIG. 1) connected to the connector 130 and also impedance matched to the loop 131.

Preferably, the extension device 102 is arranged as a cradle for receiving mobile terminal 6 as shown in FIG. 4.

In use, the extension device 102 operates substantially similar to extension device 2 described earlier. However, the signal 7 is amplified by the LNA 132 so as to compensate for signal attenuation during transmission of the signal to the mobile terminal 6 (FIG. 1). The amplified signal is fed through the loop 131.

In this way, the mobile terminal 6, which might otherwise not be able to receive the signal 7 inside the house 1, can now do so with the help of the extension device 102.

To determine whether the extension device 102 will help and/or to determine a minimum gain of the amplifier 132, a gain necessary to provide adequate indoor reception may be found by routine experiment. For example, signal strength at the antenna 8 may be measured or estimated for a typical location, such a suburb of a city. Gain of the antenna 8 may be measured or estimated. For example, a UHF antenna may be estimated as providing a gain of up to 10 dB and even up to 20 dB. Attenuation due to signal transmission by inductive coupling may be measured or estimated. Other sources of gain and loss may be taken into account. Thus, a gain (or loss) can be determined.

Third Embodiment

Figure 6:
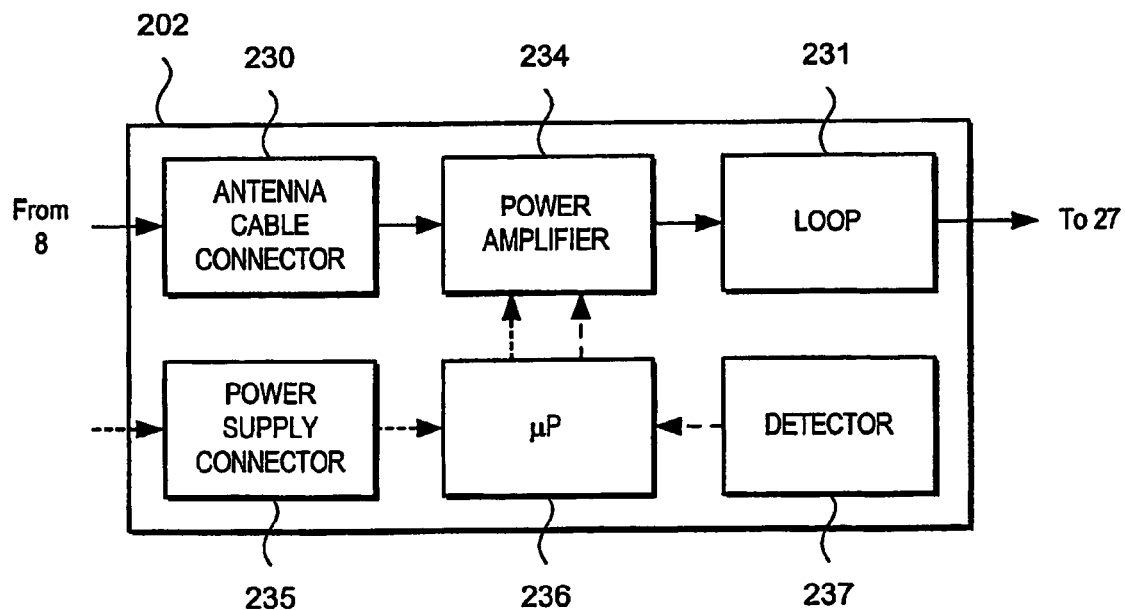
FIG. 6 is a schematic diagram of a third embodiment of an extension device according to the present invention.

Referring to FIG. 6, a third embodiment of an extension device 202 according to the present invention is shown.

The extension device 202 comprises means 230 for receiving a signal received via an antenna, which is in the form of a connector for receiving a corresponding connector (not shown) at the end of the cable 9 (FIG. 1), means 234 for power amplifying the signal in the form of a wideband UHF power amplifier and means 231 for transmitting the amplified signal to the mobile terminal by inductive coupling in the form of loop. Preferably, the power amplifier 234 is impedance matched to the cable 9 (FIG. 1) connected to the connector 230 and also impedance matched to the loop 231. Instead of being connected to the loop 231, the power amplifier 234 may be connected to an antenna (not shown), such as a radiating antenna. Furthermore, a switching means (not shown) may be provided to switch the output of the connector 230 either to the loop 231 or to power amplifier 234 for transmission via the radiating antenna.

The extension device 202 also comprises means 235 for receiving power from an external power source (not shown). Alternatively or additionally, the extension device 202 may comprise a battery. Power lines are shown as short-dashed lines.

The extension device 202 may also comprise means 236 for controlling operation of the amplifying means for example in the form of a microcontroller and means 237 for detecting whether the mobile terminal 6 is attached to or located within a predetermined distance of the extension device 202, such as a switch or electrical contact. Control and/or signalling lines are shown as long-dashed lines. The controlling means 236 may disconnect power or reduce gain of the power amplifier, if the detecting means 237 senses that the mobile terminal 6 is attached to or is close to the extension device 202, thereby limiting the power delivered to the mobile terminal 6 and preventing saturation of amplifiers and/or other circuits within the mobile terminal 6.

Preferably, the extension device 202 is arranged as a cradle for receiving mobile terminal 6 as shown in FIG. 4.

In use, the extension device 202 operates substantially similar to extension device 102 described earlier.

However, the extension device 202 may additionally limit power of the power amplifier 234 if the mobile terminal 6 is attached to or brought close to the extension device 202. For example, the extension device 202 may provide a cradle (FIG. 4) or holder and the mobile terminal 6 is placed on or in the cradle or holder, thus closing the switch 237.

An advantage of using a power amplifier 234 is that a higher power can be delivered. For example, transmitted signal power can lie in a range between 0.1 mW and 10 mW. Alternatively, transmitted signal powers of 10 mW or greater can be used.

Fourth Embodiment

Figure 7:
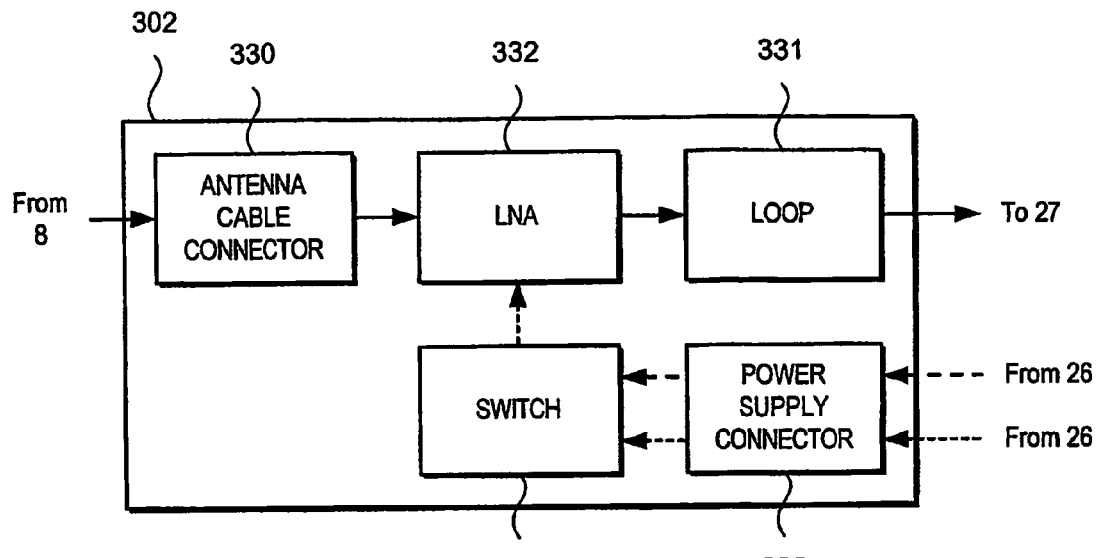
FIG. 7 is a schematic diagram of a fourth embodiment of an extension device according to the present invention.

Referring to FIG. 7, a fourth embodiment of an extension device 302 according to the present invention is shown.

The extension device 302 comprises means 330 for receiving a signal received via an antenna, which is in the form of a connector for receiving a corresponding connector (not shown) at the end of the cable 9 (FIG. 1), means 332 for amplifying the signal in the form of a wideband UHF low noise amplifier (LNA) and means 331 for transmitting the amplified signal to the mobile terminal by inductive coupling, which is in the form of loop. Preferably, the LNA 332 is impedance matched to the cable 9 (FIG. 1) connected to the connector 330 and also impedance matched to the loop 331.

The extension device 302 also comprises means 339 for receiving power from an external power source, such as e.g. mobile terminal 6. The power receiving means 339 is in one embodiment of the invention in the form of a power supply connector and is configured to be attached to the power supply connector 26 of the mobile terminal 6 (FIG. 2). The extension device 302 also comprises means 338 for controlling power supply to the LNA 332, for example in the form of a switch. Power lines are shown as short dashed lines and control/signalling lines are shown as long dashed lines.

Referring also to FIG. 4, the extension device 302 is preferably arranged as a cradle for receiving mobile terminal 6. When the mobile terminal 6 is placed in the cradle 302, the power supply connectors 26, 339 are connected, thereby enabling processor 12 (FIG. 2) to control supply of power to the extension device using switch 25 (FIG. 2) and/or switch 338.

In use, the extension device 302 operates substantially similar to extension device 102 described earlier. However, the extension device 302 may be selectively powered by the mobile terminal 6.

This is particularly useful for receiving Internet Protocol Datacasting (IPDC) service. To reduce power consumption of mobile DVB receivers, such as mobile terminal 6, IPDC services may be transmitted in bursts preferably using the entire channel bandwidth or most of it. This is known as "time slicing". Time slicing parameters such as burst transmission time, burst duration and transmission frequency (or channel) are signalled to the mobile terminal 6. With this information, the mobile DVB receiver can be switched off between bursts.

Selectively controlling power to the extension device 302 is also useful when generally receiving DVB transmissions (which may or may not be transmitted in time-sliced bursts). The mobile DVB receiver can be switched on to receive content, such a video stream or data file, transmitted at a known time and thereafter switched off. The content can be stored in storage 15 (FIG. 2) and consumed or used at a later time.

Thus, when the mobile terminal 6 is connected to the extension device 302, the mobile terminal 6 can selectively supply power to the extension device 302 to enable reception of a burst and/or a content transmission slot.

Fifth Embodiment

Figure 8:
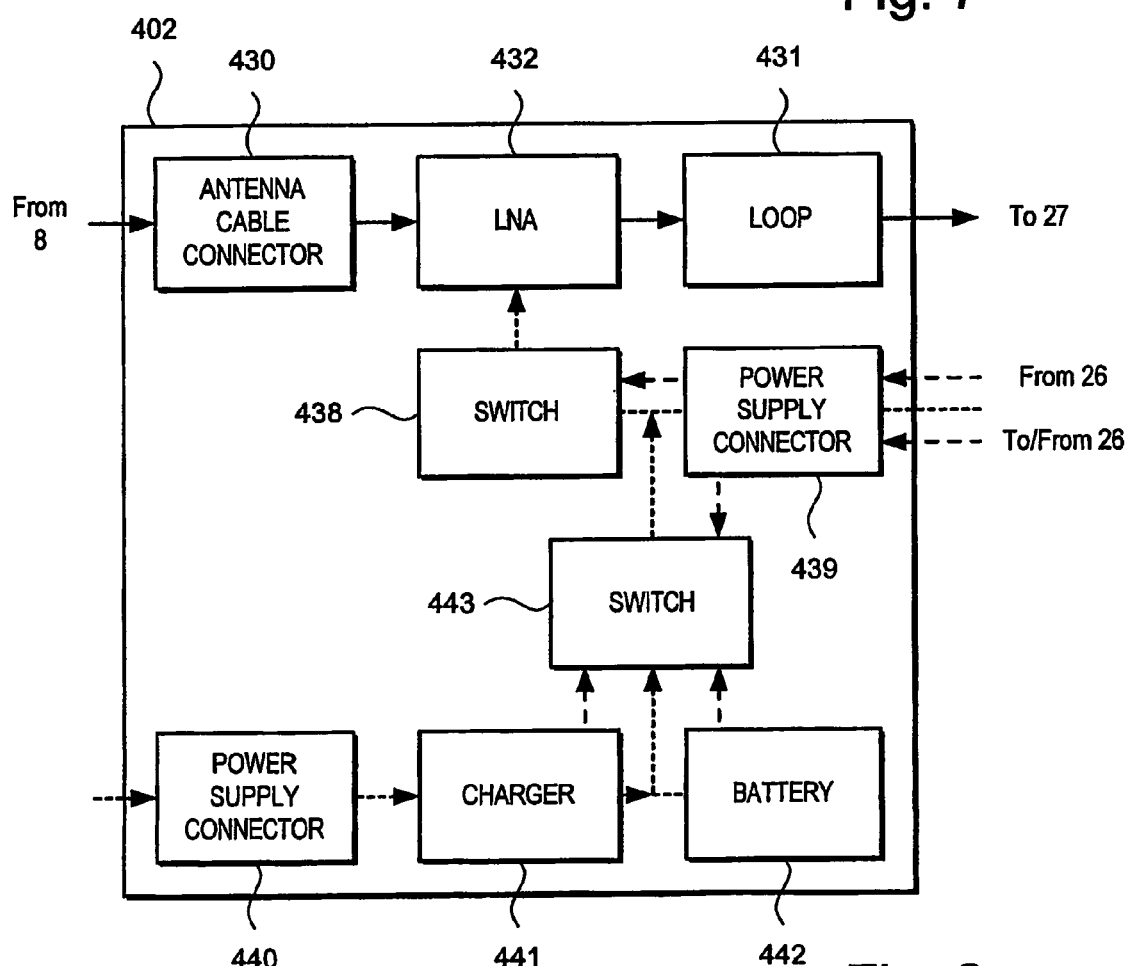
FIG. 8 is a schematic diagram of a fifth embodiment of an extension device according to the present invention.

Referring to FIG. 8, a fifth embodiment of an extension device 402 according to the present invention is shown.

The extension device 402 is similar to the extension device 302 described earlier differing in that it can power itself using a power source other than mobile terminal 6 and also in that it can provide a battery charging facility to the mobile terminal 6.

The extension device 402 comprises means 430 for receiving a signal received via an antenna, which is in the form of a connector for receiving a corresponding connector (not shown) at the end of the cable 9 (FIG. 1), means 432 for amplifying the signal in the form of a wideband UHF low noise amplifier (LNA) and means 431 for transmitting the amplified signal to the mobile terminal by inductive coupling in the form of loop. Preferably, the LNA 432 is impedance matched to the cable 9 (FIG. 1) connected to the connector 430 and also impedance matched to the loop 431.

The extension device 402 also comprises means 439 for delivering power to/from a mobile terminal 6. The power delivering means 439 is in one embodiment of the invention in the form of a power supply connector and is configured to be releasably attached or connected to the power supply connector 26 (FIG. 2). The extension device 402 also comprises means 438 for controlling power supply to the LNA 432 for example in the form of a switch. Power lines are shown as short dashed lines and control/signal lines are shown as long dashed lines.

The extension device 402 further comprises means 440 for receiving power from an external power source in the form of a power supply connector, means 441 for charging a rechargeable battery in the form of a circuit including a transformer (not shown), rectifier (not shown) and controller (not shown), means 442 for storing power in the form of a rechargeable battery and means 443 for controlling power in the form of a switch. The charging means 441 may be used to charge the battery 442 in the extension device 442 and/or the battery 24 (FIG. 2) in the mobile terminal 6. When the extension device 402 is connected to an external power source (not shown), charging means 441 charges battery 442 until it is full.

Preferably, the extension device 402 is arranged as a cradle for receiving mobile terminal 6 as shown in FIG. 4.

In use, the extension device 402 operates substantially similar to extension device 302. However, power need not be supplied by the mobile terminal 6. Nevertheless, power supply to the LNA 432 may still be controlled by the mobile terminal 6 through switch 438.

If the extension device 402 is connected to an external power source (not shown), the LNA 432 can be powered by the external source (not shown), preferably under the control of the processor 12 (FIG. 2) using switch 438. If the LNA 432 is not being powered, then the power can be used to charge battery 24 (FIG. 2).

If the extension device 402 is disconnected from the external power source (not shown), the LNA 432 can be powered by battery 442, preferably under the control of the processor 12 (FIG. 2).

If the extension device 402 is disconnected from the external power source (not shown) and there is insufficient power stored in battery 442, the LNA 432 can be powered by battery 24 (FIG. 2).

Sixth Embodiment

Figure 9:
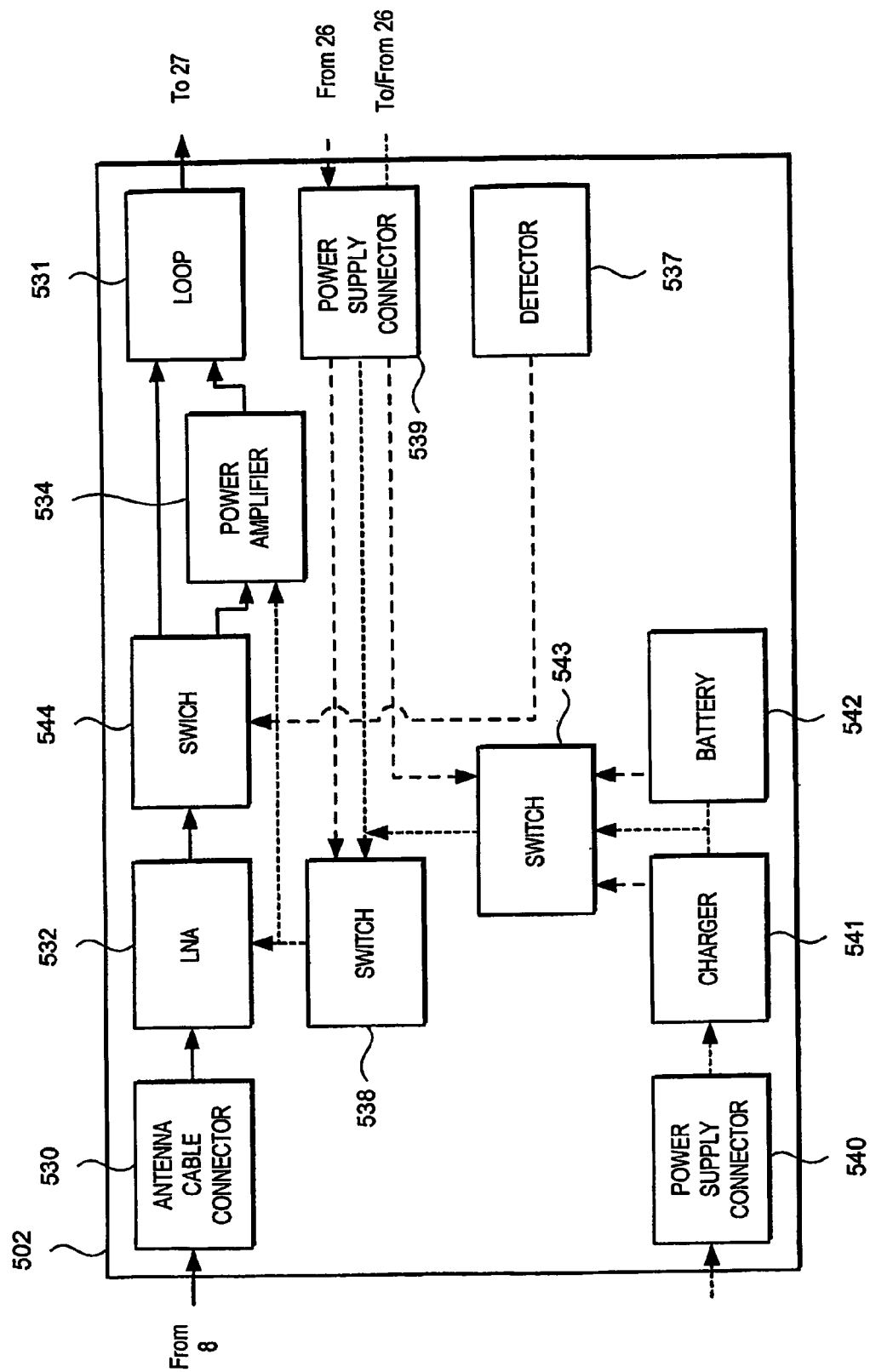
FIG. 9 is a schematic diagram of a sixth embodiment of an extension device according to the present invention.

Referring to FIG. 9, a sixth embodiment of an extension device 502 according to the present invention is shown.

The extension device 502 is similar to the extension device 402 described earlier differing in that it can transmit a more powerful signal, which can be controlled according to whether the device 502 and the mobile terminal 6 are connected.

The extension device 530 comprises means 530 for receiving a signal received via an antenna in the form of a connector for receiving a corresponding connector (not shown) at the end of the cable 9 (FIG. 1), optional first means 532 for amplifying the signal in the form of a wideband UHF low noise amplifier (LNA), a second means 534 for amplifying the signal in the form of a wideband power amplifier, means 531 for transmitting the amplified signal to the mobile terminal by inductive coupling in the form of loop and means 544 for switching the output of the LNA 532 either directly to the loop 531 or via the power amplifier 534. Instead of being connected to the loop 531, the power amplifier 534 may be connected to a radiating antenna (not shown). The extension device 502 further comprises means 537 for detecting whether the mobile terminal 6 is attached to or located within a predetermined distance of the extension device 502 and for controlling switch 544. The detecting means 537 is preferably in the form of a switch or electrical contact. Thus, if the detecting means 537 senses that the mobile terminal 6 is attached to the extension device 502, then it causes the switch 544 to switch the output of the LNA 532 directly to the loop 531 so as to by-pass the power amplifier 534. This limits the power delivered to the mobile terminal 6 and so helps to prevent saturation of amplifiers and/or other circuits.

The extension device 502 also comprises means 539 for delivering power to/from a mobile terminal 6. The power delivering means 539 is in one embodiment of the invention in the form of a power supply connector and is configured to be attached to the power supply connector 26 (FIG. 2). The extension device 502 also comprises means 538 for controlling power supply to the amplifiers 532, 534 for example in the form of a switch. Power lines are shown as short dashed lines and control lines are shown as long dashed lines.

The extension device 502 further comprises means 540 for receiving power from an external power source in the form of a power supply connector, means 541 for charging a rechargeable battery in the form of a circuit including a transformer (not shown), rectifier (not shown) and controller (not shown), means 542 for storing power in the form of a rechargeable battery and means 543 for controlling power in the form of a switch. The charging means 541 may be used to charge the battery 542 in the extension device 502 and/or the battery 24 (FIG. 2) in the mobile terminal 6, in a manner similar to that described in relation to extension device 402.

Preferably, the extension device 502 is arranged as a cradle for receiving mobile terminal 6 as shown in FIG. 4.

In use, the extension device 502 operates substantially similar to extension device 402. However, as explained earlier, if the mobile terminal 6 is connected to the extension device 502, for example by being placed in the cradle and switch 537 is actuated, then it causes switch 544 to by-pass the power amplifier 534, thereby limiting the power delivered to the mobile terminal 6. Other arrangements may be used instead of by-passing the amplifier 534. Instead, the power amplifier 534 may be disabled or set to unity gain.

The LNA 532 may be omitted. Thus, the signal may be fed directly into the loop 531 so as to by-pass the power amplifier 534.

The LNA 532 and power amplifier 534 are preferably impedance matched to elements 530, 544, 531 to which they are connected. The LNA 532 is preferably impedance matched to the cable 9 connected to the connector 530.

Seventh Embodiment

Referring to FIG. 10, a seventh embodiment of an extension device 602 according to the present invention is shown.

In previous embodiments, substantially all signals received by an extension device are amplified and re-transmitted. In this embodiment, a signal can be selectively amplified and re-transmitted.

The extension device 602 comprises means 630 for receiving a signal received via an antenna in the form of a connector for receiving a corresponding connector (not shown) at the end of the cable 9 (FIG. 1), means 645 for filtering a signal, preferably in the form of a tunable tracking filter, optional means 632 for amplifying a signal in the form of a wideband UHF low noise amplifier (LNA), means 634 for amplifying the signal in the form of a wideband power amplifier, means 631 for transmitting the amplified signal to the mobile terminal 6 by inductive coupling in the form of a loop and means 644 for switching the output of the LNA 632 either directly to the loop 631 or via the power amplifier 634. Instead of being connected to the loop 631, the power amplifier 634 may be connected to a radiating antenna (not shown). The extension device 602 comprises means 637 for detecting whether the mobile terminal 6 is attached to or located within a predetermined distance of the extension device 602 and for controlling switch 644. The detecting means 637 is preferably in the form of a switch or electrical contact. Thus, if the detecting means 637 senses that the mobile terminal 6 is attached to the extension device 602, then it causes the switch 644 to switch the output of the LNA 632 directly to the loop 631 (or other antenna) so as to by-pass the power amplifier 634 and thereby limit the power delivered to the mobile terminal 6 thus preventing saturation of amplifiers and/or other circuits. Power lines are shown as short dashed lines and control lines are shown as long dashed lines.

The extension device 602 also comprises means 639 for delivering power to/from a mobile terminal 6. The power delivering means 639 is in one embodiment of the invention in the form of a power supply connector and is configured to be attached to the power supply connector 26 (FIG. 2). The extension device 602 also comprises means 638 for controlling power supply to the amplifiers 632, 634, the filter 645 and other units 646, 647, 648, 649, preferably in the form of a switch.

Power lines are shown as short dashed lines and control lines are shown as long dashed lines.

The extension device 602 further comprises means 640 for receiving power from an external power source in the form of a power supply connector, means 641 for charging a rechargeable battery in the form of a circuit including a transformer (not shown), rectifier (not shown) and controller (not shown), means 642 for storing power in the form of a rechargeable battery and means 643 for controlling power for example in the form of a switch. The charging means 641 may be used to charge the battery 642 in the extension device 602 and/or the battery 24 (FIG. 2) in the mobile terminal 6, in a manner similar to that described in relation to extension device 402.

The extension device may optionally comprise means 646 for controlling the band pass filter, e.g. in the form of a processor, means 647 for interfacing with a user including a number of buttons (not shown), means 648 for storing data, such as memory, and means 649 for interfacing wirelessly over a short range for example in the form a Bluetooth™ transceiver.

Preferably, the extension device 602 is arranged as a cradle for receiving mobile terminal 6 as shown in FIG. 4.

In use, the user can select a given signal, which can be referred to as a channel, via user interface 647 or via a mobile terminal 6 via Bluetooth™ transceiver 29 (FIG. 2). The processor 646 causes the tunable tracking filter to select signal 7 in preference to other received signals (not shown). Thereafter, the extension device 602 operates substantially similar to extension device 502.

The signal filtering means 645 may be a complete UHF tuner in which signal 7 is converted into an intermediate frequency (IF) and re-converted back to the original frequency. The signal filtering means 645 may be fixed.

Eighth Embodiment

Figure 11:
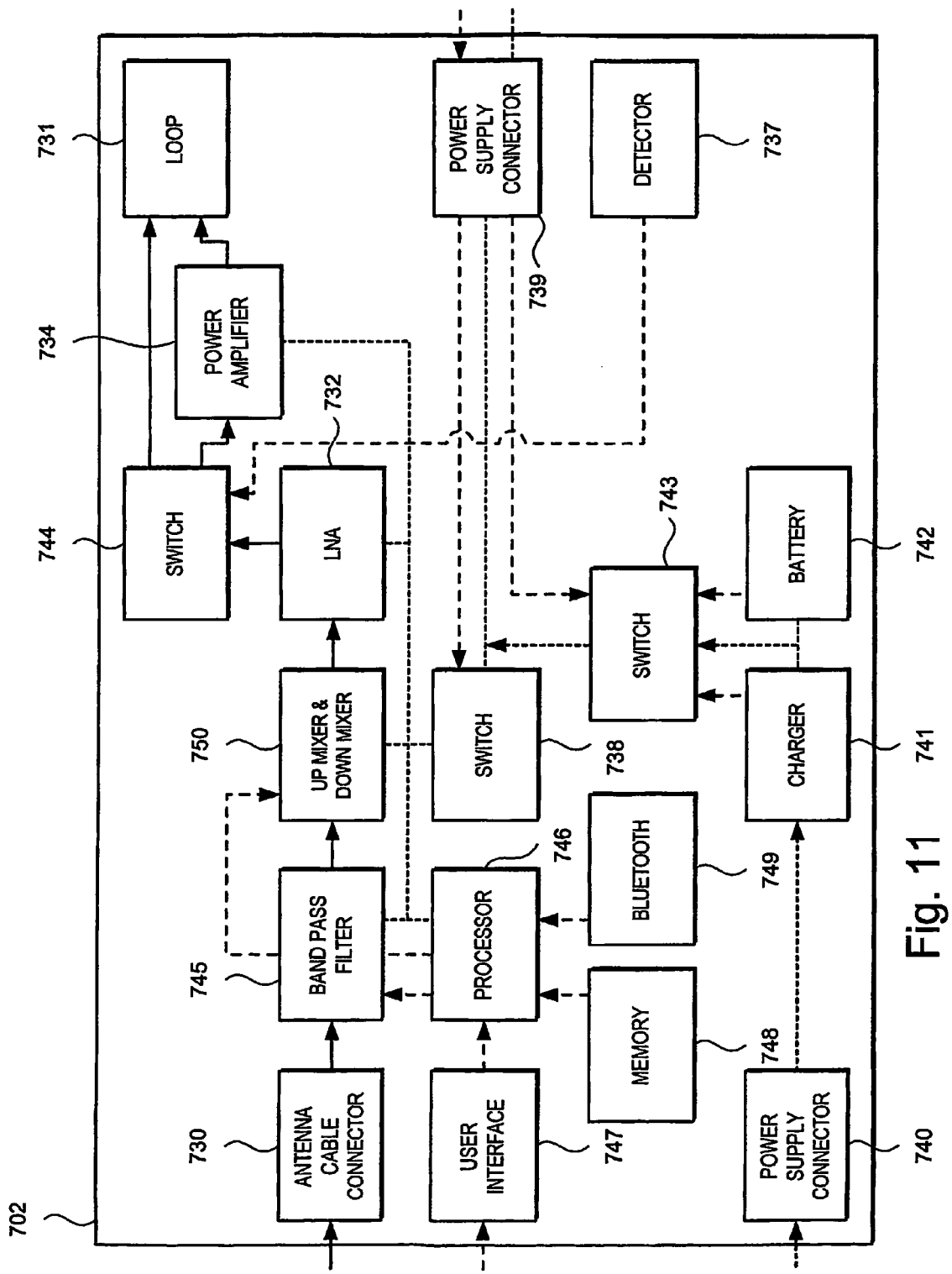
FIG. 11 is a schematic diagram of an eighth embodiment of an extension device according to the present invention.

Referring to FIG. 11, an eighth embodiment of an extension device 702 according to the present invention is shown.

The extension device 702 comprises means 730 for receiving a signal received via an antenna in the form of a connector for receiving a corresponding connector (not shown) at the end of the cable 9 (FIG. 1), means 745 for filtering a signal, preferably in the form of a tunable tracking filter, means 750 for down-converting from a first frequency to an intermediate frequency and up-converting to a second frequency, optional means 732 for amplifying a signal in the form of a wideband UHF low noise amplifier (LNA), means 734 for amplifying the signal in the form of a wideband power amplifier, means 731 for transmitting the amplified signal to the mobile terminal 6 by inductive coupling in the form of loop and means 744 for switching the output of the LNA 732 either directly to the loop 731 or via the power amplifier 734. Instead of being connected to the loop 731, the power amplifier 734 may be connected to a radiating antenna (not shown). The extension device 702 comprises means 737 for detecting whether the mobile terminal 6 is attached to or located within a predetermined distance of the extension device 702, such as a switch or electrical contact, and for controlling switch 744. Thus, if the detecting means 737 senses that the mobile terminal 6 is attached to the extension device 702, then it causes the switching means 744 to switch the output of the LNA 732 directly to the loop 731 so as to by-pass the power amplifier 734 and thereby limit the power delivered to the mobile terminal 6 thus preventing saturation of amplifiers and/or other circuits.

The extension device 702 also comprises means 739 for delivering power to/from a mobile terminal 6. The power delivering means 739 is in one embodiment of the invention in the form of a power supply connector and is configured to be attached to the power supply connector 26 (FIG. 2). The extension device 702 also comprises means 738 for controlling power supply to the amplifiers 732, 734, the filter 745, up/down converter 750 and other units 746, 747, 748, 749, in the form of a switch. Power lines are shown as short dashed lines and control lines are shown as long dashed lines.

The extension device 702 further comprises means 740 for receiving power from an external power source in the form of a power supply connector, means 741 for charging a rechargeable battery in the form of a circuit including a transformer (not shown), rectifier (not shown) and controller (not shown), means 742 for storing power in the form of a rechargeable battery and means 743 for controlling power for example in the form of a switch. The charging means 741 may be used to charge the battery 742 in the extension device 702 and/or the battery 24 (FIG. 2) in the mobile terminal 6, in a manner similar to that described earlier.

The extension device may optionally comprise means 746 for controlling the band pass filter 745 and up/down converter 750 in the form of a processor, means 747 for interfacing with a user including a number of buttons (not shown), means 748 for storing data, such as memory, and means 749 for interfacing wirelessly over a short range for example in the form a Bluetooth™ transceiver. This allows a user to select an alternate frequency for re-transmission.

Preferably, the extension device 702 is arranged as a cradle for receiving mobile terminal 6 as shown in FIG. 4.

In use, the extension device 702 operates substantially similar to extension device 602 described earlier. However, not only is it possible to select a given frequency, but also to up or down convert to another frequency.

From reading the present disclosure, other variations and modifications will be apparent to persons skilled in the art. Such variations and modifications may involve equivalent and other features which are already known and may be used instead of or in addition to features already described herein. Furthermore, any feature used in one embodiment may be used in another embodiment.

Although claims have been formulated in this application to particular combinations of features, it should be understood that the scope of the disclosure of the present invention also includes any novel features or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A device comprising:
    an interface adapted to receive a signal carrying an internet protocol datacast from a digital video broadcasting network received via an antenna; and
    a loop or coil configured to couple inductively with a corresponding loop or coil included in a mobile terminal so as to transmit the signal to the mobile terminal,
    the device adapted to convey signals unidirectionally from the interface to the mobile terminal.

2. A device according to claim 1, further comprising:
    an amplifier adapted to amplify the signal.

3. A device according to claim 2, wherein:
    said amplifier is adapted to be powered by the mobile terminal.

4. A device according to claim 2, wherein:
    said amplifier adapted to be controlled by the mobile terminal.

5. A device according to claim 4, wherein:
    said amplifier is adapted to intermittently operate under control of the mobile terminal.

6. A device according to claim 2, comprising:
    a detector adapted to determine a position of the mobile terminal; and
    a controller adapted to control operation of said amplifier in dependence upon the position of the mobile terminal.

7. A device according to claim 6, wherein:
    the detector comprises a switch to determine whether the mobile terminal is attached to the extension device.

8. A device according to claim 6, wherein:
the detector comprises a sensor adapted to determine whether the mobile terminal is located within a predetermined distance of the extension device.

9. A device according to claim 6, wherein:
the controller is adapted o cause the amplifier to reduce gain when the mobile terminal is in a given position.

10. A device according to claim 6, wherein:
the controller is adapted to cause the amplifier to be by-passed when the mobile terminal is in a given position.

11. A device according to claim 6, comprising:
an antenna for receiving an amplified signal from the amplifier and radiatively transmitting the amplified signal to the mobile terminal; wherein
the controller is adapted to cause the signal to be routed to the loop or coil when the mobile terminal is in a given position and to be routed to the amplifier when not.

12. A device according to claim 1, further comprising:
a filter adapted to obtain said signal from at least one other signal.

13. A device according to claim 1, comprising:
input for receiving power from an external source; and
a path adapted to deliver power to the mobile terminal to permit recharging of a rechargeable battery included in the mobile terminal.

14. A device according to claim 1, wherein the loop or coil is a loop and the loop is arranged substantially around a perimeter of a face of the device.

15. A device according to claim 1, wherein the loop or coil has an area of between 10 and 50 cm$^2$.

16. A device according to claim 1, which is adapted to be placed on a piece of furniture.

17. A device according to claim 1, further comprising:
an antenna mounted on a roof or to an externally facing side of an external wall of a building.

18. Device comprising:
means for receiving a signal carrying a internet protocol datacast from a digital video broadcasting network received via an antenna; and
inductive coupling means configured to couple inductively with a corresponding inductive coupling means included in a mobile terminal so as to transmit the signal to the mobile terminal,
the device adapted to convey signals unidirectionally from the interface to the mobile terminal.

19. Apparatus comprising:
device according to claim 1; and
a mobile terminal including a loop or coil for receiving the signal from the device.

20. Apparatus according to claim 19, wherein the device further comprises an amplifier arranged to amplify the signal.

21. Apparatus according to claim 20, wherein the mobile terminal is configured to cause said amplifier to operate when reception of a time slice is expected.

22. A method comprising:
receiving a signal carrying an internet protocol datacast from a digital video broadcasting network; and
providing said signal to a loop or coil configured to couple inductively with a corresponding loop or coil included in a mobile terminal so as to transmit the signal to the mobile terminal,
the method comprising conveying signals unidirectionally from the interface to the mobile terminal.

23. A method according to claim 22, further comprising:
amplifying the signal.

24. A method according to claim 22, further comprising intermittently operating an amplifier adapted to amplify the signal under the control of the mobile terminal.

25. A method according to claim 22, further comprising:
detecting a position of the mobile terminal; and
controlling operation of an amplifier in dependence upon the position of the mobile terminal.

26. A method according to claim 25, comprising:
detecting whether the mobile terminal is attached to the extension device.

27. A method according to claim 25, comprising:
sensing whether the mobile terminal is attached to the extension device.

28. A method according to claim 25, comprising:
reducing gain when the mobile terminal is in a given position.

29. A method according to claim 25, wherein:
by-passing the amplifier when the mobile terminal is in a given position.

30. A method according to claim 22, comprising:
routing the signal to the loop or coil when the mobile terminal is within a given range;
routing the signal to an amplifier when the mobile terminal is outside the given range.

31. A method according to claim 30, comprising:
radiatively transmitting an amplified signal output from the amplifier.

32. A device according to claim 1, wherein the digital video broadcasting network conforms to an Advanced Television systems Committee standard.

33. A device according to claim 1, wherein the digital video broadcasting network conforms to a Digital Video Broadcasting standard.

34. A device according to claim 1, further comprising:
a coaxial cable connected to the device.

35. A device according to claim 34, wherein the loop or coil is impedance matched to the coaxial cable.

36. A device according to claim 1, wherein the loop or coil is a loop and the loop is configured to be substantially parallel to a corresponding loop in a mobile terminal.

37. A device according to claim 1, wherein the loop or coil is configured to be coaxial with a corresponding loop or coil in a mobile terminal.

38. A device according to claim 2, wherein the amplifier is a wideband ultra high frequency low noise amplifier.

* * * * *

UNITED STATES PATENT AND TRADEMARK OFFICE
CERTIFICATE OF CORRECTION

PATENT NO. : 7,761,055 B2
APPLICATION NO. : 10/573770
DATED : July 20, 2010
INVENTOR(S) : Kimmo Laiho et al.

Page 1 of 1

It is certified that error appears in the above-identified patent and that said Letters Patent is hereby corrected as shown below:

In column 13, line 6 (claim 9, line 2), "o" should be --to--.

Signed and Sealed this
Thirty-first Day of May, 2011

David J. Kappos
*Director of the United States Patent and Trademark Office*